United States Patent [19]

Suh et al.

[11] 4,170,319
[45] Oct. 9, 1979

[54] APPARATUS FOR CONTROLLING FLUID FLOW IN A FLUID DELIVERY AND MIXING SYSTEM UTILIZING POSITIVE DISPLACEMENT DEVICES

[75] Inventors: Nam P. Suh, Sudbury; Charles L. Tucker, III, Medford, both of Mass.

[73] Assignee: Massachusetts Institute of Technology, Cambridge, Mass.

[21] Appl. No.: 801,321

[22] Filed: May 31, 1977

[51] Int. Cl.$^2$ ............................................. B67D 5/60
[52] U.S. Cl. .................................... 222/134; 137/99; 222/135; 222/335
[58] Field of Search ............... 222/134, 135, 145, 335, 222/57; 239/61; 137/99

[56] References Cited

U.S. PATENT DOCUMENTS

| 2,870,776 | 1/1959 | Marsh ..................................... 137/99 |
| 3,053,842 | 9/1962 | Meissner ............................ 137/99 X |
| 3,232,585 | 2/1966 | Garbarino .......................... 137/99 X |
| 3,298,383 | 1/1967 | Cooper ............................... 222/134 X |
| 3,672,389 | 4/1972 | McConnell et al. ................... 137/99 |
| 4,019,652 | 4/1977 | Suh et al. ......................... 222/335 X |

Primary Examiner—Robert J. Spar
Assistant Examiner—Fred A. Silverberg
Attorney, Agent, or Firm—Arthur A. Smith, Jr.; Robert F. O'Connell

[57] ABSTRACT

A system for mixing a shot of at least two fluid components in which the components are stored in accumulators and are supplied simultaneously therefrom to the input ports of a mixing device. The fluid components are stored in the accumulators at preselected pressures which will tend to assure that the fluids are supplied approximately at a desired preselected volume flow rate ratio. Positive displacement devices are placed in the lines which supply the fluids from the accumulators to the mixing device, such devices being mechanically linked through gear linkage having a gear ratio selected in accordance with the preselected volume flow rate ratio. During operation, the positive displacement devices assure that the preselected volume flow rate ratio of the fluids is maintained at the desired ratio throughout the entire shot.

6 Claims, 2 Drawing Figures

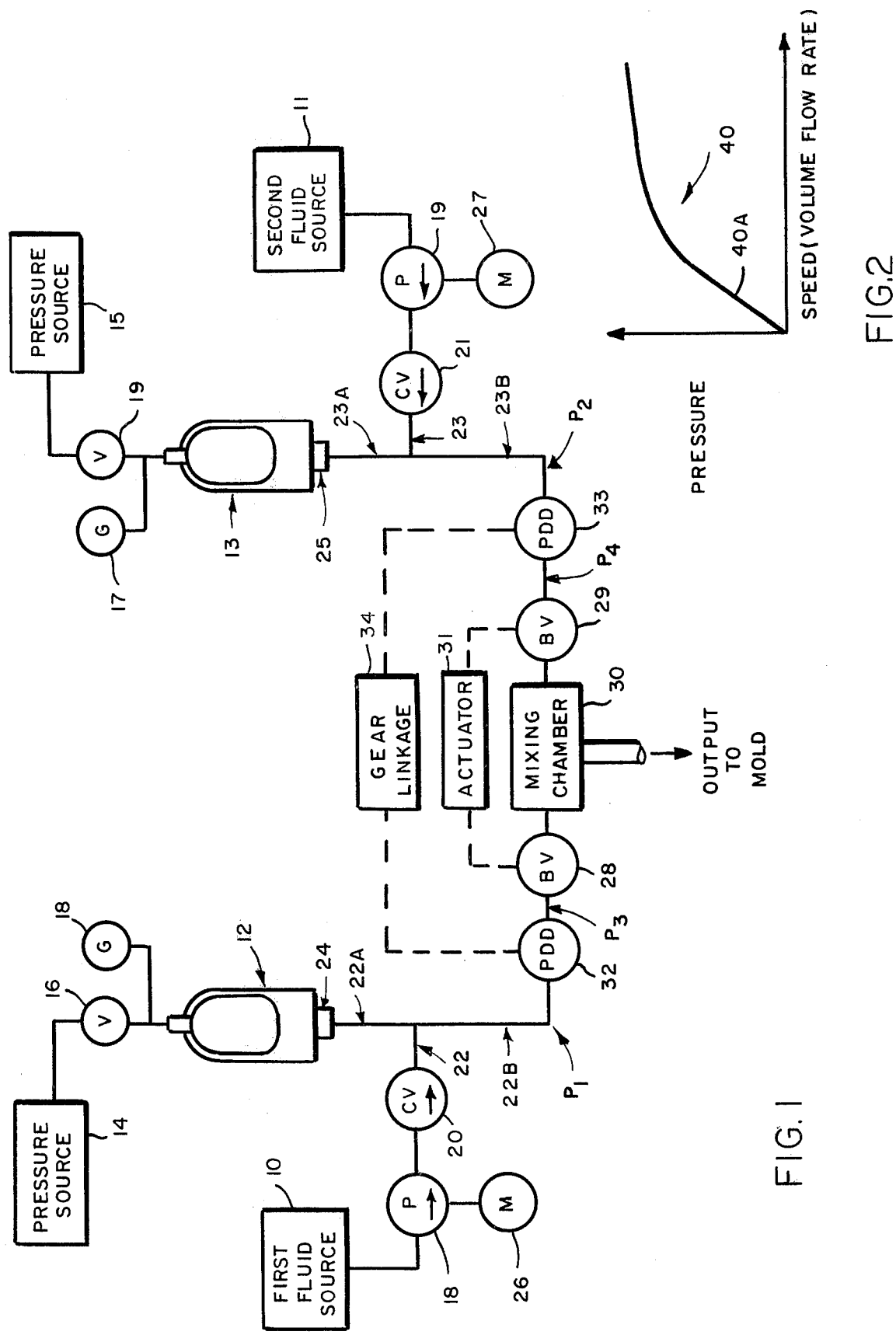

APPARATUS FOR CONTROLLING FLUID FLOW IN A FLUID DELIVERY AND MIXING SYSTEM UTILIZING POSITIVE DISPLACEMENT DEVICES

The Government has rights in this invention pursuant to NSF Cooperative Agreement No. CG-0006 awarded by the National Science Foundation.

INTRODUCTION

This invention relates generally to fluid delivery and mixing systems and, more particularly, to means for accurately controlling the flow of fluids into the mixing device thereof.

BACKGROUND OF THE INVENTION

A reaction injection molding (R.I.M.) process is one in which two or more liquid resin components are rapidly mixed and injected into a mold where they react and cure to form a finished solid article. In a typical reaction injection molding process, for example, a polyol liquid is reacted with an isocyanate liquid to form a polyurethane. Such processes are sometimes alternatively referred to as liquid injection molding (L.I.M.) processes, or liquid reaction molding (L.R.M.) processes.

Such processes are often used to make relatively large articles with relatively inexpensive machines. For example, R.I.M. processes are used in making automobile parts and in the manufacture of shoe soles.

The resin components utilized are generally relatively viscous materials, sometimes having viscosities in a range from 10 to 1000 centipoises, for example. Such resins usually react quickly, some having a "gel" time as short as a few seconds. Mixing ratios by volume are normally in a range from about 3:1 to 1:1 and flow rates by weight are usually in a range from about 0.5 to 5 kilograms/second (i.e., about 1 to 10 pounds per second), although machines having larger flow rates have been available to the art. A typical operating time cycle might include an injection time of 2–5 seconds and a reaction and cure time of about 60 seconds.

Effective mixing of viscous resins is often achieved by using impingement mixers in which the fluid streams are injected at high velocities into a mixing chamber in a manner such that they impinge upon each other, the resultant mixture then being directly supplied to a mold cavity. Pressures as high as 1000 p.s.i. to 3000 p.s.i. are required to force the fluid streams through the small nozzles of the impingement mixer. An impingement mixing technique offers advantages in providing a low mixing chamber volume, easy cleaning thereof, and good mixing at high flow rates. However, such systems require that the fluids be delivered in the proper ratio by volume at all times which in turn requires that accurate control of the fluid flows is necessary if the most effective use of impingement mixing chambers is to be made. In most applications the volume ratio must be maintained to within 1% accuracy and in certain applications accuracies of 0.1% or better are required.

DESCRIPTION OF THE PRIOR ART

Conventional reaction injection molding equipment generally uses high pressure pumps having high flow rates to deliver each component from a reservoir thereof to the mixing head. Such pumps usually have adjustable displacements and are driven by constant speed motors. Before delivering the mixture to the mold, the motors are started and permitted to reach a steady state condition, during which preliminary time period the fluids are re-circulated. When a molding is to be made, valves in the mixing head are opened to direct the fluid into the mixing chamber to start the one-shot delivery. The valves are switched back to their recirculating positions to end the shot and a ram is usually utilized to clean the mixed fluid out of the mixing chamber, the pumps then being shut down to await the next shot.

Power requirements for such machines are fairly large and to meet such requirements two relatively high powered motors (e.g., 50 h.p. motors) are normally needed for even a moderately sized molding machine. Moreover, fluid flow ratio errors occur during operation, which errors are of both a steady state character and a dynamic, or transient, nature. The major source of the steady state error lies in the non-ideal behavior of the pumps which are used, which pumps usually have leakage flows which give rise to the error. Most attempts to reduce such steady state errors have been related to the design of the pumps with minimal leakage flow, that is, maximum resistance of the pump to leakage. Such designs, however, are relatively expensive and such pumps thereupon become relatively critical components of the machine.

An important source of dynamic errors lies in the use of flexible hoses which connect the pumps to the mixing head, which flexible lines are normally required since the mix head is mounted directly on the mold and molds must often be titled or otherwise oriented at difficult positions in order to obtain optimum filling characteristics. Because of the presence of fluid capacitance associated with the use of flexible hoses, errors in the flow rates to the mixing head will often occur due to the difference in the steady state values of the pressures required to supply a flow of liquid to the mixture chamber and to provide the re-circulating pressure of the fluid just prior to the start of the shot.

Some prior art systems attempt to eliminate such dynamic errors by making the fluid pressures equal by utilizing adjustable orifices or needle valves in the mixing head for such purpose. Other systems utilize both an adjustable orifice in the mixing head and an adjustable capacitance (e.g., an hydraulic accumulator) in the delivery line. The complexity of the mechanical requirements and the difficulty in finding the proper adjustments make such solutions expensive and difficult to use in practice.

One important system which has been described for providing accurate control of flow is disclosed in U.S. patent application Ser. No. 628,965, filed Nov. 5, 1975, now U.S. Pat. No. 4,019,652, issued Apr. 16, 1977, to Nam P. Suh et al. and assigned to the same assignee as this application. In such system the fluids to be mixed are stored in separate accumulators and are supplied substantially simultaneously to a mixing chamber, the pressure decay characteristics of each of the accumulators being controlled to provide substantially the same shapes for their decay characteristics. The characteristics of the fluid components themselves, the size of the input ports to the mixing chambers, and the predetermined pressures to which the fluids in the accumulators are initially charged are suitably selected so that the ratio of the flow rates by weight of the fluid at the input ports to the mixing head remains constant and the momenta of the fluids at the input ports are substantially equal. Such a system reduces the overall power requirements compared with conventional machines available prior thereto for the same pressures and output flow rates. While the same amount of energy is required to deliver a given volume of the fluids into the mix chamber at high flow rates, the system provides such energy over a much longer period of time so that the power requirement is decreased and the overall machine is permitted to be smaller and lighter and, accordingly, less expensive than previously used machines. In this system, the pressures at the accumulators are selected so as to provide the volume flow rate ratios which are desired in accordance with the previously determined pressure vs. volume flow rate characteristic of each of the accumulator systems.

In the utilization of such a system, however, it has been found that the accumulator system alone cannot be relied upon to maintain accurate ratios of volume flow rates over long periods of use in many applications and, for this reason, it is desirable that other means for controlling such ratios be found in order to take advantage of the ability of such systems to deliver high flow rates at low cost.

BRIEF SUMMARY OF THE INVENTION

The system of the invention provides a means for accurately controlling such volume flow rates for use in a system substantially the same as that described in the above-referenced Suh et al. application without any requirement for additional power inputs. In accordance therewith, a positive displacement device is provided in each fluid delivery line between the accumulator and the mixing chamber input ports. The positive displacement devices are mechanically linked so as to turn in a selected ratio. Each of the devices has a relatively low pressure drop thereacross and the linkages are arranged so that the pressure difference in one device is always opposite to that in the other, i.e., when the pressure across one device drops, the pressure across the other device rises, and vice versa. The gear ratio in the geared linkage therebetween is arranged to be equal to the desired ratio of pressure drops thereacross.

The flow rate into the mixing chamber depends upon the pressure versus flow characteristic, or fluid resistance, of the nozzle and the connecting lines thereto as well as upon the driving pressure supplied by the accumulator. By suitably choosing the pressures to which the accumulators are initially charged, both the flow rates and the mix ratio can be chosen. If one fluid component tends to run too fast (i.e., its volume flow rate is greater than desired), its positive displacement device acts as an hydraulic motor for slowing down the fluid stream and, in turn, the linkage transmits torque to the other positive displacement device which thereupon acts as a pump to speed up the other fluid stream. By setting the original accumulator pressures so that the two fluids run relatively close to the correct volume flow rate ratio which is desired before the system is placed into operation, the torque transmitted by such mechanical linkage can be minimized. Since the torque on the positive displacement device is proportional to the pressure difference across it, the setting of the accumulator pressures to provide volume flow rates which are as close as possible to the desired rates before operation also has the effect of minimizing the pressure drops across the positive displacement devices. Minimizing of such pressure drops also minimizes the leakage flow. Accordingly, such devices transmit very little power and may be small and light in construction. Thus, they may be installed directly at or near the input ports of the mixing device without the need for extensive flexible lines therebetween. The effect of such placement is to tend to reduce the dynamic errors which normally arise therefrom to zero.

Because the mechanically-linked, positive displacement devices accurately maintain the desired volume flow rate ratio, less critical components can be utilized in other portions of the system in comparison with conventional equipment. Conversely, increased accuracy in maintaining the desired volume flow rate ratio can be obtained by using comparable components to those used on conventional equipment.

DESCRIPTION OF THE INVENTION

The invention can be described in more detail with the help of the accompanying drawing wherein FIG. 1 shows a block diagram of a preferred embodiment of the system of the invention; and FIG. 2 shows a graph depicting in a qualitative manner a representative curve of the relationships between accumulator pressure and volume flow rate.

As can be seen in FIG. 1, a first fluid component is supplied from a fluid source 10 and a second fluid component is supplied from a fluid source 11. Accumulators 12 and 13 associated with each fluid component are of a conventional bladder type, the bladders there being initially filled with an appropriate gas such as nitrogen, at a predetermined pressure from pressure sources 14 and 15, respectively, via valves 16 and 17, respectively. The pressures therein are monitored by appropriate gauges 18 and 19, respectively.

Once the accumulator bladders have been supplied at the desired pressure with the selected gas, the bladders substantially fill the accumulator housings in a conventionally known manner. Each fluid component is thereupon supplied to its respective accumulator from appropriate sources 10 and 11 via pumps 18 and 19, respectively, through check valves 20 and 21, respectively, and then through fluid conveying lines 22 and 23 via branches 22A and 23A thereof, respectively. The fluids enter accumulators 12 and 13 via poppet valves (P.V.) 24 and 25 and fill the interiors of the housings thereof external to the bladders until a sufficient supply of fluid components are thereupon maintained within the accumulators at substantially higher selected pressures than the original pressures at which the bladders were filled, such higher pressures being appropriately selected, as discussed in more detail below, and monitored by gauges 18 and 19.

Once the accumulators have been filled and the motors 26 and 27 which drive pumps 18 and 19 are shut off, check valves 20 and 21 prevent the return of any fluid to the sources thereof. At the same time ball valves 28 and 29 in branch lines 22B and 23B, respectively, are inoperative (i.e., closed) so that the fluid components are retained within accumulators 12 and 13 at the selected pressures indicated by the gauges.

When it is desired to deliver the fluid components to the mixing chamber 30, the ball valves 28 and 29 are actuated simultaneously by a suitable pneumatic actuator 31 which may be a conventional rotary type or a linear type using a suitable linkage so that the fluids are delivered to the ball valves via the positive displacement devices 32 and 33, respectively, substantially at the accumulator pressures. The fluid which is thereupon delivered through ball valves 28 and 29 is supplied directly to the input ports of the mixing chamber 30.

The positive displacement devices 32 and 33 are mechanically linked through an appropriate gear linkage mechanism 34 the gear ratio of which is selected so that the positive displacement devices pass the fluid at a preselected volume flow rate. Such positive displacement devices, for example, may be of the type made and sold by the Hydraulics Division, Borg-Warner Corporation, Wooster, Ohio, under the model designation Hydraulic Gear Motor M30-29.

If the initial accumulator pressures are suitably set without the presence of fluid and if the fluids are then supplied thereto to charge the accumulators to selected pressures at the beginning of a shot so as to provide a volume flow ratio at the mixing device which is reasonably close to the desired volume flow rate ratio, the gear ratio for the positive displacement devices can be set for the desired volume flow ratio and such ratio can be maintained during operation with minimal torque and pressure drops being developed across the positive displacement devices.

Two preferred techniques for setting the accumulator pressures in accordance with the invention have been developed. As is well-known, the relationship between pressure changes and volume changes can be expressed as:

$$V/V_o = 1 - (P/P_o)^{1/\gamma} \quad (1)$$

where $V_o$ and $P_o$ are the initial volume and pressure values, V and P are the new volume and pressure values, and $\gamma$ is the polytropic exponent. This expression can be alternatively expressed as:

$$P/P_o = (1 - V/V_o)^{-\gamma} \quad (2)$$

For a particular system, $\gamma$ can be determined by making appropriate measurements under changing pressure and volume conditions. Here, the measurements can be made empirically by noting the volume changes of fluid in operating each accumulator to provide one or more exemplary shots over exemplary time periods T and calculating the average $\gamma$ which results in accordance with the one of the above equations (1) or (2).

In accordance with the first of the preferred techniques which have been developed, the gear linkage 31 is first disconnected from the positive placement devices 32 and 33 and a rotational speed measuring device, such as a tachometer, is placed on each of the shafts of positive placement devices 32 and 33. A pressure transducer is placed at the output of each accumulator to provide an accurate measure of the pressures thereof in terms of voltage levels. With such measuring devices in place, fluid is supplied to each of the accumulators until the accumulator pressures are each at predetermined arbitrary values. The fluids are then delivered to the mixing chamber and the pressure decays are measured by the pressure transducers and the rotational speeds are measured by the tachometers. Since the rotational speeds are, in effect, representative of the volume flow rates of the fluids, curves or pressure changes as a function of rotational speeds can be obtained which represent qualitative curves of pressure changes as a function of volume flow rates, as shown by a typical exemplary qualitative curve 40 in FIG. 2. As can be seen, such curves have substantially linear portions 40A, the slope of such portion being designated as K for one accumulator and as K* for the other accumulator.

It is desirable that the values of K and K* be related to the pressures of the accumulators in accordance with the following expressions:

$$\frac{P_o}{P^*_o} = (\beta)^{\gamma+1}\frac{K}{K^*} \quad (3)$$

and $$\frac{P}{P^*} = \beta \frac{K}{k^*} \quad (4)$$

where $P_0$ and $P^*_0$ are the desired initial gas pressures to be set at each accumulator without any liquid therein, $\gamma$ is as defined above, P and P* are the pressures at each accumulator at any point in time after the liquids have been inserted therein, or during a shot, K and K* are the slopes of pressure vs. volume flow rate curves for each accumulator, as discussed above, and $\beta$ is the preselected desired volume flow rate ratio for a particular shot. Once the desired initial pressure $P_0$ for one accumulator is determined, the initial pressure $P^*_0$ for the other accumulator can be determined by the above relationship.

In order to determine $P_0$ the following expression has been developed:

$$P_0 = \frac{V_o K}{T(\gamma+1)} \left[ (1 - \frac{V_c}{V_o})^{\gamma+1} - (1 - \frac{V_c + V_d}{V_o})^{\gamma+1} \right] \quad (5)$$

where $V_0$ is the volume in the accumulator itself, $V_d$ is the desired volume of liquid to be delivered to the mixing chamber in a preselected shot, T is the time of the shot, $V_c$ is a preselected "cushion volume" which can be defined as the volume of liquid which is to remain following a shot (an arbitrary value which acts as a safety factor to assure that sufficient liquid is available for the shot), and the remaining quantities K and $\gamma$ are defined and determined as discussed above. Since all of such quantities are known, either through measurement or by selection of the shot conditions, $P_0$ for one accumulator can be calculated by Equation (5).

Knowing $P_0$ permits calculation of $P^*_0$ by the use of Equation (4). With a knowledge of $P^*_0$ Equation (5) can be used to determine the "cushion volume" $V^*_c$ for the other accumulator so as to make sure that under the pressure conditions calculated a sufficient volume of the other liquid is available for the shot. If $V^*_c$ is determined to be positive, the pressure conditions for $P_0$ and $P^*_0$ are appropriate to assure sufficient volumes of both liquids. If $V^*_c$ is determined to be negative, a positive value for $V^*_c$ can be selected and $P^*_0$ recalculated from Equation (5) (knowing $V^*_0$, $K^*$ and $V^*_d$ as well as T and $\gamma$). From the recalculated $P^*_0$, a recalculated $P_0$ can be determined from Equation (4) and the required "cushion volume" $V_c$ for the first accumulator can then be recalculated.

Knowing $P_0$, $P^*_0$, $V_0$, $V^*_0$ and $\gamma$, and knowing the desired total volume V and V* of liquid required for each accumulator (i.e., $V = V_d + V_c$ and $V^* = V^*_d + V^*_c$), the pressures $P_1$ and $P^*_1$ to which the accumulator must be charged at the start of the shot can be determined from Equations (1) or (2).

For a typical shot using the system of the invention, the values can be, for example:

| | |
|---|---|
| T = 1 sec. | K = 5.20 lbs.sec./in.$^5$ |
| $\gamma$ = 1.19 | K* = 10.61 lbs.sec./in.$^5$ |
| $V_d$ = 163.4 cu. in. | $\beta$ = 1.8407 |

-continued

| | |
|---|---|
| $V_c = 50$ cu. in. | $V^*_d = 88.7$ cu. in. |
| $P_0 = 729$ lbs./in.$^2$ | $V_c = 527$ cu. in. |
| $P_1 = 944$ lbs./in.$^2$ | $P^*_0 = 391$ lbs./in.$^2$ |
| $P_2 = 771$ lbs./in.$^2$ | $P^*_1 = 1046$ lbs./in.$^2$ |
| $V_0 = V^*_0 = 1095$ cu. in. | $P^*_2 = 855$ lbs./in.$^2$ | wherein $P_2$ and $P^*_2$ are the accumulator pressures at the end of the shot.

While the above technique for setting the accumulator pressures is useful, since it requires a partial dismantling of the equipment in order to measure the values of K and K* it is sometimes more desirable to obtain the pressure values in a manner which permits appropriate measurements to be made without such dismantling action. An alternative technique has been devised which makes use of the following expression:

$$\left[\frac{K}{K^*}\right]_A = \left[\frac{K}{K^*}\right]_E \left[1 - \frac{\tau \beta}{P^*d}\right] - \frac{\tau}{\beta P^*d} \quad (6)$$

In accordance therewith, the positive displacement devices 32 and 33 and the linkage therebetween being connected as required for an actual shot, $[K/K^*]_A$ is the actual ratio of such quantities, $[K/K^*]_E$ is an estimated ratio thereof, $\tau$ is the torque which is transmitted between the positive displacement devices, d is the pump displacement of such devices, and $\beta$ is as defined above. The torque which arises at the positive displacement devices can be measured by utilizing a dynamometer and the pump displacement of such devices is known from the operating characteristics thereof as obtained, for example, from the manufacturer.

With the system in use, a shot can be made and the torque $\tau$ and pressure P* at the second accumulator can be monitored over the duration of the shot. If the ratio $(K/K^*)_E$ is estimated at some reasonable value, and if the mean values of the torque $\tau$ and pressure P* are measured over the duration of the shot, the actual ratio $[K/K^*]_A$ can be determined from Equation (6). The mean values of torque $\tau$ and pressure P* can be determined by recording such values thereof at selected points in time to calculate the mean values thereof.

Since the initial values of the accumulator pressure $P_0$ and volume $V_0$ are known for the shot, the value of K can be calculated from Equation (5). For this purpose, in order to determine the volume $V_d$ of liquid delivered by the first accumulator and the time of the shot, the shot may be set for a fixed time T and the volume determined by using a tachometer to measure the rotating speed of the positive displacement device associated therewith (which provides the volume flow rate) and then integrating the tachometer output to obtain the volume delivered. Alternately, the shot may be set for a fixed volume $V_d$ (to be measured by the integral of the tachometer speed) and the time T noted when such volume is reached. Since the total volume $V_0$ of liquid in the accumulator is known, the "cushion volume" can then be calculated.

Once K is determined from Equation (5), the calculation of the other desired pressures can be performed as discussed above for the first technique. The second technique, wherein the ratio $(K/K^*)_E$ is estimated and the actual ratio $(K/K^*)_A$ is determined, permits the needed pressure calculations to be made by performing a single sample shot for the system as it will actually operate during use without the need for disconnecting the linkages and making a new set of calculations for K and K* every time the conditions for use change (e.g., when different liquids are to be mixed, etc.). Further, the second technique appears to lend itself more readily to implementation by a microprogrammed data processing system which performs the necessary calculations, when suitably programmed, when the required input data are supplied thereto.

In any event, should the calculated pressures $P_0$, $P^*_0$, $P_1$ and $P^*_1$, as determined by either technique, not be exactly correct, they will be close enough so that the presence of positive displacement devices 32 and 33 will automatically correct for any errors therein. Accordingly, the setting of the gear ratio to the desired volume flow rate ratio will assure that the required volume flow rate relationship is maintained over the entire duration of a shot.

When the system is in operation in accordance with the invention the following relationships hold with respect to the system as depicted in FIG. 1;

$P_1 >> P_1 - P_3$ $P_2 >> P_2 - P_4$ where $P_1$, $P_2$, $P_3$ and $P_4$ are designated on the figure.

What is claimed is:

1. A system for mixing at least two fluid components, said system comprising
   at least two sources for providing at least two different fluid components;
   at least two accumulator means;
   means for independently supplying under pressure to each of said accumulator means a different one of said fluid components from said fluid component sources, said accumulator means each thereby being independently charged to a selected predetermined pressure, said predetermined pressures being selected to provide for a predetermined volume flow rate ratio of said fluid components;
   a mixing device having at least two input ports for receiving said at least two fluid components and at least one output port for delivering a mixture of said at least two fluid components therefrom;
   supply line means associated with each of said accumulator means for supplying the associated fluid components therefrom to separate ones of said input ports;
   means for controlling the supply of said fluid components to said mixing device from said at least two accumulator means, said controlling means including
   positive displacement means in each of said supply line means;
   means for linking the operations of said positive displacement means for controlling the accuracy of the volume flow rates of said fluid components through said positive displacement means so that the volume flow rates of said fluid components, as supplied to said mixing device, are maintained in a preselected relationship, said predetermined volume flow rates of said fluid components provided for by said predetermined pressures to which each accumulator means are independently charged being so selected as to minimize the pressure drop across each said positive displacement means when the supply of said fluid components is activated, whereby errors in the maintenance of said volume flow rates by said positive displacement means are minimized; and means for activating the supply of said fluid components from said accumulator means to said mixing device.

2. A system in accordance with claim 1 wherein said system includes two accumulator means for supplying two fluid components at a preselected volume flow rate ratio to two input ports of said mixing device; and further wherein said linking-means mechanically links the operation of said positive displacement means.

3. A system in accordance with claim 2 wherein said mechanical linking means is a gear linkage means having a selectable gear ratio selected in accordance with said preselected volume flow rate ratio.

4. A system in accordance with claim 3 wherein said positive displacement means comprise two such means arranged to operate so that the pressure difference across one of said positive displacement means is opposite to that across the other of said positive displacement means.

5. A system in accordance with claim 4 wherein the pressures at said accumulators are selected to provide for a volume flow rate ratio of said fluid components which is reasonably close to said preselected volume flow rate ratio, said linked positive displacement means thereby maintaining the accuracy of said preselected volume flow rate ratio over the time period during which said fluid components are supplied to said mixing device.

6. A system in accordance with claim 1 wherein said fluid components are liquids.

* * * * *